United States Patent
Brazil et al.

(10) Patent No.: US 12,410,071 B1
(45) Date of Patent: Sep. 9, 2025

(54) SYSTEM AND METHOD FOR REMOVAL OF PFAS AND OTHER EMERGING CONTAMINANT MICRO-CONSTITUENTS FROM LANDFILL LEACHATE AND OTHER IMPACTED LIQUIDS

(71) Applicant: WM INTELLECTUAL PROPERTY HOLDINGS, L.L.C., Houston, TX (US)

(72) Inventors: Brian Brazil, Damascus, MD (US); Rohan Menon, Chester Springs, PA (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 17/505,516

(22) Filed: Oct. 19, 2021

Related U.S. Application Data

(60) Provisional application No. 63/093,421, filed on Oct. 19, 2020.

(51) Int. Cl.
*C02F 9/00* (2023.01)
*B01D 53/02* (2006.01)
(Continued)

(52) U.S. Cl.
CPC .............. *C02F 1/281* (2013.01); *B01D 53/02* (2013.01); *C02F 1/58* (2013.01); *B01D 2253/11* (2013.01);
(Continued)

(58) Field of Classification Search
CPC .... C02F 9/00; C02F 1/283; C02F 1/42; C02F 1/441; C02F 1/4672; C02F 2101/26;
(Continued)

(56) References Cited

U.S. PATENT DOCUMENTS

| | | | |
|---|---|---|---|
| 3,882,153 | A | 5/1975 | Seki et al. |
| 5,182,023 | A | 1/1993 | O'Connor et al. |

(Continued)

FOREIGN PATENT DOCUMENTS

| | | |
|---|---|---|
| AU | 2016102108 A4 | 1/2017 |
| AU | 2020203659 A1 | 1/2021 |

(Continued)

OTHER PUBLICATIONS

Merino, Nancy et al.; Degradation and Removal Methods for Perfluoroalkyl and Polyfluoroalkyl Substances in Water; Environmentla Enginnering Science; vol. 33, No. 9; Mary Ann Liebert, Inc.; Aug. 22, 2016; 35 pages.

(Continued)

*Primary Examiner* — Dirk R Bass
(74) *Attorney, Agent, or Firm* — Greenberg Traurig LLP

(57) ABSTRACT

A system and method for removing PFAS from residual waste streams generated during the processing of landfill liquids prior to disposal are provided. An example of a landfill liquid is leachate. Landfill leachate can contain dissolved or entrained environmentally harmful substances such as PFAS and other emerging contaminant micro-constituents that may enter the environment if not properly treated. The presently disclosed system and method can improve the removal of PFAS and other emerging contaminant micro-constituents in landfill leachate and/or landfill impacted liquids including stormwater and contaminated groundwater.

12 Claims, 6 Drawing Sheets

(51) Int. Cl.
*C02F 1/28* (2023.01)
*C02F 1/42* (2023.01)
*C02F 1/44* (2023.01)
*C02F 1/58* (2023.01)
C02F 101/36 (2006.01)
C02F 103/06 (2006.01)

(52) U.S. Cl.
CPC ...... *C02F 2101/36* (2013.01); *C02F 2103/06* (2013.01)

(58) Field of Classification Search
CPC ........ C02F 2103/06; C02F 1/281; C02F 1/58; C02F 2101/36; B01D 53/02; B01D 2253/11
See application file for complete search history.

(56) References Cited

U.S. PATENT DOCUMENTS

| | | |
|---|---|---|
| 6,436,244 B1 | 8/2002 | Fuhrer et al. |
| 6,642,415 B1 | 11/2003 | Fuhrer et al. |
| 6,743,957 B2 | 6/2004 | Fuda et al. |
| 6,814,840 B2 | 11/2004 | Henuset et al. |
| 7,351,342 B2 | 4/2008 | Funaki et al. |
| 7,404,907 B2 | 7/2008 | Welcker |
| 7,485,232 B2 | 2/2009 | Yamasaki et al. |
| 7,641,798 B2 | 1/2010 | Yamasaki et al. |
| 9,095,840 B2 | 8/2015 | Cannon et al. |
| 9,221,695 B2 | 12/2015 | Fath |
| 9,284,201 B2 | 3/2016 | Kambala et al. |
| 9,308,519 B2 | 4/2016 | Adachi et al. |
| 9,440,866 B2 | 9/2016 | Legzdins |
| 9,687,816 B2 | 6/2017 | Suri |
| 9,708,246 B2 | 7/2017 | Otsugu et al. |
| 9,731,989 B2 | 8/2017 | Polizzotti et al. |
| 9,828,458 B2 | 11/2017 | Suri et al. |
| 9,957,172 B2 | 5/2018 | Niu et al. |
| 10,287,185 B2 | 5/2019 | Nickelsen et al. |
| 10,494,281 B2 | 12/2019 | Szczesniak et al. |
| 10,752,521 B2 | 8/2020 | Nelson |
| 10,844,285 B1 | 11/2020 | Livingston et al. |
| 11,623,884 B1 | 4/2023 | Menon |
| 2003/0098282 A1 | 5/2003 | Funaki et al. |
| 2005/0145571 A1 | 7/2005 | Strauss et al. |
| 2007/0101461 A1 | 5/2007 | Van Der Lelie et al. |
| 2010/0000947 A1 | 1/2010 | Koizumi et al. |
| 2010/0084343 A1 | 4/2010 | Mader et al. |
| 2011/0005915 A1 | 1/2011 | Mercier et al. |
| 2011/0186495 A1 | 8/2011 | Robinson et al. |
| 2013/0316898 A1 | 11/2013 | De Leij et al. |
| 2015/0053620 A1 | 2/2015 | Suri et al. |
| 2016/0207796 A1 | 7/2016 | Li et al. |
| 2018/0187253 A1 | 7/2018 | Yamamoto et al. |
| 2018/0282530 A1 | 10/2018 | O'Shea et al. |
| 2019/0060691 A1 | 2/2019 | Lee et al. |
| 2019/0185352 A1 | 6/2019 | Chiang |
| 2019/0226315 A1 | 7/2019 | Laramay et al. |
| 2019/0263696 A1* | 8/2019 | Bott .................. C02F 9/00 |
| 2019/0283001 A1 | 9/2019 | Ortiz et al. |
| 2020/0155885 A1 | 5/2020 | Strathmann et al. |
| 2020/0171409 A1 | 6/2020 | Cho |
| 2020/0179997 A1 | 6/2020 | Ross et al. |
| 2020/0197903 A1 | 6/2020 | Turner |
| 2020/0206793 A1 | 7/2020 | Brady |
| 2020/0222953 A1* | 7/2020 | Morrell .................. B09C 1/025 |
| 2020/0239336 A1 | 7/2020 | Lutterbach |
| 2020/0262719 A1 | 8/2020 | Pennell et al. |
| 2020/0283309 A1 | 9/2020 | Reid et al. |
| 2020/0292516 A1 | 9/2020 | Kaltenberg et al. |
| 2020/0306726 A1 | 10/2020 | James et al. |
| 2020/0339450 A1 | 10/2020 | Franceschi-Hofmann et al. |
| 2020/0368717 A1 | 11/2020 | Donovan |
| 2020/0398221 A1 | 12/2020 | Arias-Paic et al. |
| 2020/0398249 A1 | 12/2020 | Hoffman, Jr. et al. |
| 2020/0399147 A1 | 12/2020 | Yost et al. |
| 2020/0407241 A1 | 12/2020 | Dejarme et al. |
| 2020/0407248 A1 | 12/2020 | Yang et al. |
| 2021/0008522 A1 | 1/2021 | Reeve et al. |
| 2021/0009449 A1 | 1/2021 | Borowski et al. |
| 2021/0032136 A1 | 2/2021 | Cates et al. |
| 2021/0047208 A1 | 2/2021 | Douglas |
| 2021/0101804 A1 | 4/2021 | Garber |
| 2021/0206667 A1 | 7/2021 | Locke et al. |
| 2022/0009809 A1* | 1/2022 | Xiao .................. C02F 9/00 |
| 2022/0054981 A1 | 2/2022 | Benton et al. |

FOREIGN PATENT DOCUMENTS

| | | |
|---|---|---|
| CN | 1196526 C | 4/2005 |
| CN | 1249135 C | 4/2006 |
| CN | 1935771 A | 3/2007 |
| CN | 101070204 A | 11/2007 |
| CN | 101130157 A | 2/2008 |
| CN | 201058823 Y | 5/2008 |
| CN | 101298039 B | 6/2010 |
| CN | 101708883 B | 8/2011 |
| CN | 101992061 B | 7/2012 |
| CN | 101928078 B | 8/2012 |
| CN | 102659224 A | 9/2012 |
| CN | 102276012 B | 10/2012 |
| CN | 102351272 B | 1/2013 |
| CN | 102872832 A | 1/2013 |
| CN | 102874900 A | 1/2013 |
| CN | 102107977 | 5/2013 |
| CN | 102489260 B | 7/2013 |
| CN | 103183397 A | 7/2013 |
| CN | 203159277 U | 8/2013 |
| CN | 102500338 B | 10/2013 |
| CN | 102689948 B | 11/2013 |
| CN | 103408103 A | 11/2013 |
| CN | 103058319 B | 6/2014 |
| CN | 102701329 B | 8/2014 |
| CN | 104069838 A | 10/2014 |
| CN | 103086420 B | 11/2014 |
| CN | 103819013 B | 2/2015 |
| CN | 104549179 A | 4/2015 |
| CN | 103936096 B | 5/2015 |
| CN | 104628193 A | 5/2015 |
| CN | 104773884 A | 7/2015 |
| CN | 103170308 B | 8/2015 |
| CN | 104925971 A | 9/2015 |
| CN | 103962137 B | 11/2015 |
| CN | 104261519 B | 1/2016 |
| CN | 105271501 A | 1/2016 |
| CN | 103991948 B | 2/2016 |
| CN | 105540756 A | 5/2016 |
| CN | 105692798 | 6/2016 |
| CN | 105692852 A | 6/2016 |
| CN | 104496141 B | 7/2016 |
| CN | 105776404 A | 7/2016 |
| CN | 104512942 B | 8/2016 |
| CN | 106082389 A | 11/2016 |
| CN | 104192978 B | 3/2017 |
| CN | 105001371 B | 3/2017 |
| CN | 106732379 A | 5/2017 |
| CN | 105195116 B | 6/2017 |
| CN | 105195100 B | 8/2017 |
| CN | 107162250 A | 9/2017 |
| CN | 105060389 B | 10/2017 |
| CN | 106268675 B | 1/2018 |
| CN | 106215881 B | 2/2018 |
| CN | 106046279 B | 3/2018 |
| CN | 106345432 B | 3/2018 |
| CN | 108144572 A | 6/2018 |
| CN | 108264127 A | 7/2018 |
| CN | 105664847 B | 8/2018 |
| CN | 106000355 B | 8/2018 |
| CN | 105329976 B | 11/2018 |
| CN | 108854997 A | 11/2018 |
| CN | 106219666 B | 3/2019 |
| CN | 106984289 B | 3/2019 |
| CN | 107126939 B | 3/2019 |
| CN | 109574381 A | 4/2019 |

(56) References Cited

FOREIGN PATENT DOCUMENTS

| | | |
|---|---|---|
| CN | 106390933 B | 7/2019 |
| CN | 108543524 B | 8/2019 |
| CN | 110127892 A | 8/2019 |
| CN | 108607513 B | 9/2019 |
| CN | 108620025 B | 9/2019 |
| CN | 110255694 A | 9/2019 |
| CN | 110354823 A | 10/2019 |
| CN | 111013554 A | 4/2020 |
| CN | 108178273 B | 5/2020 |
| CN | 108341438 B | 5/2020 |
| CN | 108408919 B | 5/2020 |
| CN | 111087110 A | 5/2020 |
| CN | 109126873 B | 6/2020 |
| CN | 109772258 B | 6/2020 |
| CN | 107952419 B | 7/2020 |
| CN | 107162161 B | 9/2020 |
| CN | 107416943 B | 10/2020 |
| CN | 111330547 B | 10/2020 |
| CN | 111825151 A | 10/2020 |
| CN | 111825255 A | 10/2020 |
| CN | 110496589 B | 11/2020 |
| CN | 109589971 B | 3/2021 |
| CN | 107986379 B | 5/2021 |
| CN | 109759116 B | 6/2021 |
| CN | 111170402 B | 7/2021 |
| CN | 111171199 B | 8/2021 |
| CN | 110327853 B | 9/2021 |
| CN | 110255693 B | 5/2022 |
| CN | 110465271 B | 6/2022 |
| CN | 110938282 B | 8/2022 |
| CN | 111841499 B | 2/2023 |
| CN | 111389372 B | 3/2023 |
| CN | 111569856 B | 6/2023 |
| EP | 0014431 B1 | 8/1982 |
| EP | 2353711 A1 | 8/2011 |
| EP | 2431334 A1 | 3/2012 |
| EP | 2102113 B1 | 1/2015 |
| EP | 3426611 B1 | 5/2020 |
| EP | 2964579 B1 | 6/2020 |
| EP | 3738674 A1 | 11/2020 |
| FR | 3077069 A1 | 7/2019 |
| IT | 201800010553 A1 | 5/2020 |
| JP | 2003212921 A | 7/2003 |
| JP | 2003285076 A | 10/2003 |
| JP | 2007253012 A | 10/2007 |
| JP | 2009022887 A | 2/2009 |
| JP | 2010022960 A | 2/2010 |
| JP | 2010022961 A | 2/2010 |
| JP | 2010046648 A | 3/2010 |
| JP | 2010075834 A | 4/2010 |
| JP | 2010119931 A | 6/2010 |
| JP | 2010269241 A | 12/2010 |
| JP | 2011025102 A | 2/2011 |
| JP | 4685673 B2 | 5/2011 |
| JP | 4770802 B2 | 9/2011 |
| JP | 2012101159 A | 5/2012 |
| JP | 4949742 B2 | 6/2012 |
| JP | 5053951 B2 | 10/2012 |
| JP | 5079620 B2 | 11/2012 |
| JP | 5079638 B2 | 11/2012 |
| JP | 5112231 B2 | 1/2013 |
| JP | 5172252 B2 | 3/2013 |
| JP | 5215199 B2 | 6/2013 |
| JP | 5364313 B2 | 12/2013 |
| JP | 2016153113 A | 8/2016 |
| JP | 2017104792 A | 6/2017 |
| KR | 20090067670 A | 6/2009 |
| KR | 101328700 B1 | 11/2013 |
| KR | 20140145272 A | 12/2014 |
| RU | 2644206 C1 | 2/2018 |
| TW | I486311 B | 6/2015 |
| WO | 1999062858 A1 | 12/1999 |
| WO | 2003066532 A1 | 8/2003 |
| WO | 2008109219 A1 | 9/2008 |
| WO | 2008109579 A1 | 9/2008 |
| WO | 2008109582 A1 | 9/2008 |
| WO | 2011018514 A1 | 2/2011 |
| WO | 2011101342 A1 | 8/2011 |
| WO | 2013119121 A1 | 8/2013 |
| WO | 2014/027175 | 2/2014 |
| WO | 2016087461 A1 | 6/2016 |
| WO | 2016091159 A1 | 6/2016 |
| WO | 2017131972 A1 | 8/2017 |
| WO | 2017210752 A1 | 12/2017 |
| WO | 2018027273 A1 | 2/2018 |
| WO | 2018035474 A1 | 2/2018 |
| WO | 2018039706 A1 | 3/2018 |
| WO | 2018053630 A1 | 3/2018 |
| WO | 2018102866 A1 | 6/2018 |
| WO | 2018175936 A1 | 9/2018 |
| WO | 2019111238 A1 | 6/2019 |
| WO | 2019113073 A1 | 6/2019 |
| WO | 2019113268 A1 | 6/2019 |
| WO | 2019169177 A1 | 9/2019 |
| WO | 2020010407 A1 | 1/2020 |
| WO | 2020012371 A1 | 1/2020 |
| WO | 2020023993 A1 | 2/2020 |
| WO | 2020027682 A2 | 2/2020 |
| WO | 2020037061 A1 | 2/2020 |
| WO | 2020041712 A1 | 2/2020 |
| WO | 2020068538 A1 | 4/2020 |
| WO | 2020113004 A1 | 6/2020 |
| WO | 2020114556 A1 | 6/2020 |
| WO | 2020163252 A1 | 8/2020 |
| WO | 2020168104 A1 | 8/2020 |
| WO | 2020168385 A1 | 8/2020 |
| WO | 2020172132 A1 | 8/2020 |
| WO | 2020181141 A1 | 9/2020 |
| WO | 2020205635 A1 | 10/2020 |
| WO | 2020206317 A1 | 10/2020 |
| WO | 2020236435 A1 | 11/2020 |
| WO | 2020237291 A1 | 12/2020 |
| WO | 2020243510 A1 | 12/2020 |
| WO | 2020247029 A1 | 12/2020 |
| WO | 2020260487 A1 | 12/2020 |
| WO | 2020264112 A1 | 12/2020 |

OTHER PUBLICATIONS

Niu, Junfeng et al.; Electrochemical Oxidation of Perfluorinated Compunds in Water; Chemosphere; Dec. 30, 2015; 13 pages.

Du, Ziwen et al.; Removal of Perfluorinated Carboxylates from Washing Wastewater of Perfluorooctanesulfonyl Flouride Using Activated Carbons and Resins; Journal of Hazardous Meterials; Dec. 24, 2014; 8 pages.

Zaggia, Alessandro et al.; Use of Strong Anion Exchange Resins for the Removal of Perfluoroalkylated Substances from Contaminated Drinking Water in Batch and Continuous Pilot Plants; Water Research Zaggia 2016; Dec. 30, 2015; 10 pages.

https://aquaticlife.com/blogs/news/how-temperature-affects-ro-water-production; Jan. 1, 2019; 6 pages.

Shaheen, Fatima Anis et al.; Reverse Osmosis Pretreatment Technologies and Future Trends: A Comprehensive Review; Desalination, vol. 452; pp. 159-195; Nov. 22, 2018.

Ahmed, Mohammad Boshir et al.; Advanced treatment technologies efficacies and mechanism of per-and poly-fluoroalkyl substances removal from water; Institution of Chemical Engineers; Elsevier B.V.; Jan. 13, 2020; 14 pages.

Appleman, Timothy D. et al.; Nanofiltration and granular activated carbon treatment of perfluoroalkyl acids; Journal of Hazardous Materials; Elsevier B.V.; Jun. 21, 2013; 7 pages.

Appleman, Tomothy D. et al.; Treatment of poly- and perfluoroalkyl substances in U.S. full-scale water treatment systems; ScienceDirect; Elsevier Ltd.; Nov. 7, 2013; 10 pages.

Ateia, Mohamed et al.; Cationic polymer for selective removal of GenX and short-chain PFAS from surface waters and wastewaters at ng/L levels; Water Research; Elsevier Ltd.; Jul. 15, 2019; 8 pages.

Ateia, Mohamed et al.; The overlooked short- and ultrashort-chain poly- and perfluorinated substances: A review; Chemsphere, Elsevier Ltd .; Jan. 4, 2019; 17 pages.

(56) References Cited

OTHER PUBLICATIONS

Belkouteb, Nadine et al.; Removal of per- and polyfluoroalkyl substances (PFASs) in a full-scale drinking water treatment plant: Long-term performance of granular activated carbon (GAC) and influence of flow-rate; Water Research; The Authors, Elsevier Ltd.; May 22, 2020; 10 pages.

Bertanza, Giorgio et al.; Long-terminvestigation on the removal of perfluoroalkyl substances in a full-scale drinking water treatment plant in the Veneto Region, Italy; Science of the Total Environment; Elsevier B.V.; May 5, 2020; 12 pages.

Campbell, Tammy et al.; Sonochemical degradation of perfluorinated surfactants: Power and multiple frequency effects; Separation and Purification Technology; Elsevier B.V.; Oct. 1, 2015; 9 pages.

Cao, Huimin et al.; Sonochemical degradation of poly- and perfluoroalkyl substances—A review; Ultrasonics—Sonochemistry, Elsevier B.V.; Jul. 12, 2020; 11 pages.

Chen, Shuqin et al.; Seasonal and annual variations in removal efficiency of perfluoroalkyl substances by different wastewater treatment processes; Environmental Pollution, Elsevier Ltd.; Jun. 27, 2018; 9 pages.

Chen, Xi et al.; A comparative study on sorption of perfluorooctane sulfonate (PFOS) by chars, ash and carbon nanotubes; Chemosphere, Elsevier Ltd.; Apr. 30, 2011; 7 pages.

Dai, Yunrong et al.; Photochemical transformation of perfluoroalkyl acid precursors in water using engineered nanomaterials; Water Research, Elsevier Ltd.; May 20, 2020; 8 pages.

Deng, Shubo et al.; Enhanced adsorption of perfluorooctane sulfonate andperfluorooctanoate by bamboo-derived granular activated carbon; Journal of Hazardous Materials, Elsevier B.V.; Mar. 31, 2014; 8 pages.

Dixit, Fuhar et al.; PFAS removal by ion exchange resins: A review; Chemosphere, Elsevier Ltd.; Feb. 3, 2021; 17 pages.

Dixit, Fuhar et al.; Removal of legacy PFAS and other fluorotelomers: Optimized regeneration strategies in DOM-rich waters; Water Research, Elsevier Ltd.; Jun. 26, 2020; 13 pages.

Du, Ziwen et al.; Removal of perfluorinated carboxylates from washing wastewater of perfluorooctanesulfonyl fluoride using activated carbons and resins; Journal of Hazardous Materials, Elsevier B.V.; Dec. 24, 2014; 8 pages.

Duan, Xiaoyue; Electrocatalytic degradation of perfluoroocatane sulfonate (PFOS) on a 3D graphene-lead dioxide (3DG-PbO2) composite anode: Electrode characterization, degradation mechanism and toxicity; Chemosphere, Elsevier Ltd.; Jul. 9, 2020; 10 pages.

Fang, Chen et al.; Removal of PFAS from aqueous solution using PbO2 from lead-acid battery; Chemosphere, Elsevier Ltd.; Nov. 30, 2018; 9 pages.

Franke, Vera et al.; Efficient removal of per- and polyfluoroalkyl substances (PFASs) in drinking water treatment: nanofiltration combined with active carbon or anion exchange; Environmental Science Water Research & Technology; The Royal Society of Chemistry; Jun. 11, 2019; 9 pages.

Franke, Vera et al.; Removal of per- and polyfluoroalkyl substances (PFASs) from tap water using heterogeneously catalyzed ozonation; Environmental Science, Water Research & Technology; The Royal Society of Chemistry; Sep. 5, 2019; 1887-1896.

Gagliano, Erica et al.; Removal of poly- and perfluoroalkyl substances (PFAS) from water by adsorption: Role of PFAS chain length, effect of organic matter and challenges in adsorbent regeneration; Water Research, Elsevier Ltd.; Dec. 10, 2019; 31 pages.

Gao, Yanxin et al.; Adsorptive removal of emerging polyfluoroalky substances F-53B and PFOS by anion-exchange resin: A comparative study; Journal of Hazardous Materials, Elsevier B.V.; Apr. 28, 2016; 8 pages.

Gole, Vitthal L. et al.; Treatment of perfluorooctane sulfonic acid (PFOS) using a large-scale sonochemical reactor; Separation and Purification Technology, Elsevier B.V.; Nov. 7, 2017; 7 pages.

Gomez-Ruiz, Beatriz et al.; Photocatalytic degradation and mineralization of perfluorooctanoicacid (PFOA) using a composite TiO2-rGO catalyst; Journal of Hazardous Materials, Elsevier B.V.; Nov. 28, 2017; 8 pages.

Gong, Yanyan et al.; Removal of aqueous perfluorooctanoic acid (PFOA) using starch-stabilized magnetite nanoparticles; Science of the Total Environment, Elsevier B.V.; Apr. 18, 2016; 10 pages.

Hao, Feifei et al.; Intensification of sonochemical degradation of ammonium perfluorooctanoate by persulfate oxidant; Ultrasonics Sonochemistry, Elsevier B.V.; Oct. 4, 2013; 5 pages.

Kah, Melanie et al.; Sequestration and potential release of PFAS from spent engineered sorbents; Science of the Total Environment, Elsevier B.V.; Oct. 7, 2020; 10 pages.

Kim, Tae-Hun et al.; Decomposition of perfluorooctane sulfonate (PFOS) using a hybrid process with electron beam and chemical oxidants; Chemical Engineering journal, Elsevier B.V.; Oct. 28, 2018; 8 pages.

Kucharzyk, Katarzyna H. et al.; Novel treatment technologies for PFAS compounds: A critical review; Journal of Environmental Management, Elsevier Ltd.; Aug. 14, 2017; 8 pages.

Lakshminarasimman, Narasimman et al.; Removal and formation of perfluoroalkyl substances in Canadian sludge treatment systems—A mass balance approach; Science of the Total Environment, Elsevier B.V.; Sep. 21, 2020; 10 pages.

Lei, Yong-Jia; Synergistic degradation of PFAS in water and soil by dual-frequency ultrasonic activated persulfate; Chemical Engineering Journal, Elsevier B.V.; Jan. 28, 2020; 12 pages.

Li, Fan et al.; A concentrate-and-destroy technique for degradation of perfluorooctanoic acid in water using a new adsorptive photocatalyst; Water Research, Elsevier Ltd.; Jul. 22, 2020; 14 pages.

Li, Mingjie et al.; Photocatalytic decomposition of perfluorooctanoic acid by noble metallic nanoparticles modified TiO2; Chemical Engineering Journal, Elsevier B.V.; Nov. 3, 2015; 7 pages.

Li, Shuo et al.; Microwave enhanced Fenton-like process for degradation of perfluorooctanoic acid (PFOA) using Pb-BiFeO3/rGO as heterogeneous catalyst; Chemical Engineering Journal, Elsevier B.V.; Jun. 8, 2017; 9 pages.

Liu, Jinxia et al.; Microbial degradation of polyfluoroalkyl chemicals in the environment: A review; Environment international, Elsevier Ltd.; Oct. 11, 2013; 17 pages.

Liu, Yingying et al.; Application of zero-valent iron coupled with biochar for removal of perfluoroalkyl carboxylic and sulfonic acids from water under ambient environmental conditions; Science of the Total Environment, Elsevier B.V.; Feb. 18, 2020; 10 pages.

Lu, Dingnan et al.; Treatment train approaches for the remediation of per- and polyfluoroalkyl substances (PFAS): A critical review; Journal of Hazardous Materials, Elsevier B.V.; Dec. 26, 2019; 14 pages.

Lu, Xinyu et al.; Adsorption behavior and mechanism of perfluorooctane sulfonate on nanosized inorganic oxides; Journal of Colloid and Interface Science, Elsevier Inc.; Apr. 22, 2016; 7 pages.

McCleaf, Philip et al.; Removal efficiency of multiple poly- and perfluoroalkyl substances (PFASs) in drinking water using granular activated carbon (GAC) and anion exchange (AE) column tests; Water Research, Elsevier Ltd.; Apr. 26, 2017; 11 pages.

Militao, Iarin Medeiros et al.; Removing PFAS from aquatic systems using natural and renewable material-based adsorbents: A review; journal pre-proof; Journal of Environmental Chemical Engineering; Feb. 20, 2021; 51 pages.

Murray, Conner C. et al.; Removal of per- and polyfluoroalkyl substances using super-fine powder activated carbon and ceramic membrane filtration; Journal of Hazardous Materials, Elsevier B.V.; Nov. 15, 2018; 9 pages.

Niu, Junfeng et al.; Electrochemical oxidation of perfluorinated compounds in water; Chemosphere, Elsevier Ltd.; Dec. 30, 2015; 13 pages.

Palma, Davide et al.; PFAS Degradation in Ultrapure and Groundwater Using Non-Thermal Plasma; Molecules, MDPI; Feb. 9, 2021; 13 pages.

Panda, Debabrata et al.; Kinetics and mechanism of low-frequency ultrasound driven elimination of trace level aqueous

(56) References Cited

OTHER PUBLICATIONS perfluorooctanesulfonic acid and perfluorooctanoic acid; Chemical Engineering & Processing: Process Intensification, Elsevier B.V.; May 29, 2019; 8 pages.
Park, Kyungmin et al.; Photodegradation of perfluorooctanoic acid by graphene oxide-deposited TiO2 nanotube arrays in aqueous phase; Journal of Environmental Management, Elsevier Ltd.; Apr. 22, 2018; 7 pages.
Park, Minkyu et al.; Magnetic ion-exchange (MIEX) resin for perfluorinated alkylsubstance (PFAS) removal in groundwater: Roles of atomic charges for adsorption; Water Research, Elsevier Ltd.; May 19, 2020; 10 pages.
Pierpaoli, Mattia et al.; Electrochemical oxidation of PFOA and PFOS in landfill leachates at low and highly boron-doped diamond electrodes; Journal of Hazardous Materials, Elsevier B.V.; Aug. 4, 2020; 11 pages.
Qian, Lin et al.; Degradation of perfluorooctanoic acid adsorbed on Fe-zeolites with molecular oxygen as oxidant under UV-A irradiation; Applied Catalysis B: Environmental, Elsevier B.V.; Jun. 26, 2020; 10 pages.
Rodriguez-Freire, Lucia et al.; Effect of sound frequency and initial concentration on thesonochemical degradation of perfluorooctane sulfonate (PFOS); Journal of Hazardous Materials, Elsevier B.V.; Aug. 3, 2015; 8 pages.
Schaefer, Charles E. et al.; Electrochemical treatment of perfluorooctanoic acid and perfluorooctane sulfonate: Insights into mechanisms and application to groundwater treatment; Chemical Engineering Journal, Elsevier B.V.; Feb. 21, 2017; 9 pages.
Shao, Tian et al.; Photocatalytic decomposition of perfluorooctanoic acid in pure water and wastewater by needle-like nanostructured gallium oxide; Dalian Institute of Chemical Physics, Chinese Academy of Sciences; ScienceDirect, Elsevier B.V.; Aug. 20, 2013; 6 pages.
Shende, Takshak et al.; Kinetic model for sonolytic degradation of non-volatile surfactants: Perfluoroalkyl substances; Ultrasonics—Sonochemistry, Elsevier B.V.; Sep. 5, 2018; 10 pages.
Silvani, Ludovica et al.; Can biochar and designer biochar be used to remediate per- and polyfluorinated alkyl substances (PFAS) and lead and antimony contaminated soils?; Science of the Total Environment, Elsevier B.V.; Jul. 31, 2019; 9 pages.
Singh, Raj Kamal et al.; Treatment of PFAS-containing landfill leachate using an enhanced contact plasma reactor; Journal of Hazardous Materials, Elsevier B.V.; Nov. 16, 2020; 7 pages.
Sorengard, Mattias et al.; Electrodialytic per- and polyfluoroalkyl substances (PFASs) removal mechanism for contaminated soil; Chemosphere, Elsevier Ltd.; May 22, 2019; 8 pages.
Soriano, Alvaro et al.; Enhanced treatment of perfluoroalkyl acids in groundwater by membrane separation and electrochemical oxidation; Chemical Engineering Journal Advances, Elsevier B.V.; Oct. 19, 2020; 9 pages.
Trautmann, A.M. et al.; Electrochemical degradation of perfluoroalkyl and polyfluoroalkyl substances (PFASs) in groundwater; Water Science & Technology, IWA publishing; 2015; pp. 1569-1575.
Turner, Brett D.; Novel remediation of per- and polyfluoroalkyl substances (PFASs) from contaminated groundwater using Cannabis Sativa L. (hemp) protein powder; Chemosphere, Elsevier Ltd.; Apr. 28, 2019; 10 pages.
Ulrich, Hanna et al.; Getting on with persistent pollutants: Decreasing trends of perfluoroalkyl acids (PFAAs) in sewage sludge; Chemosphere, Elsevier Ltd.; Jul. 26, 2016; 9 pages.

Vo, Hoang Nhat Phong et al.; Poly-and perfluoroalkyl substances in water and wastewater: A comprehensive review from sources to remediation; Journal of Water Process Engineering, Elsevier Ltd.; Jun. 5, 2020.
Wang, Fei et al.; Removal of perfluoroalkyl sulfonates (PFAS) from aqueous solution using permanently confined micelle arrays (PCMAs); Separation and Purification Technology, Elsevier B.V.; Oct. 18, 2014; 6 pages.
Wang, Shana et al.; Photocatalytic degradation of perfluorooctanoic acid and perfluorooctane sulfonate in water: A critical review; Chemical Engineering Journal, Elsevier B.V.; Jul. 13, 2017; 16 pages.
Wu, Congyue et al.; Exploring the factors that influence the adsorption of anionic PFAS on conventional and emerging adsorbents in aquatic matrices; Water Research, Elsevier Ltd.; May 25, 2020; 9 pages.
Xu, Bentuo et al.; Improved photocatalysis of perfluorooctanoic acid in water and wastewater by Ga2O3/UV system assisted by peroxymonosulfate; Chemosphere, Elsevier Ltd.; Sep. 2, 2019; 9 pages.
Xu, Bentuo et al.; Photocatalytic removal of perfluoroalkyl substances from water and wastewater: Mechanism, kinetics and controlling factors; Chemosphere, Elsevier Ltd.; Sep. 25, 2017; 13 pages.
Xu, Tianyuan et al.; Enhanced adsorption and photocatalytic degradation of perfluorooctanoic acid in water using iron (hydr)oxides/carbon sphere composite; Chemical Engineering Journal, Elsevier B.V.; Jan. 27, 2020; 10 pages.
Xu, Zesheng; Highly efficient and stable Zr-doped nanocrystalline PbO2 electrode for mineralization of perfluorooctanoic acid in a sequential treatment system; Science of the Total Environment, Elsevier B.V.; Dec. 5, 2016; 8 pages.
Yan, Bei et al.; Molecular mechanisms of per- and polyfluoroalkyl substances on a modified clay: a combined experimental and molecular simulation study; Water Research, Elsevier Ltd.; Jul. 10, 2020; 12 pages.
Zaggia, Alessandro et al.; Use of strong anion exchange resins for the removal of perfluoroalkylated substances from contaminated drinking water in batch and continuous pilot plants; Water Research, Elsevier Ltd.; Dec. 30, 2015; 10 pages.
Zhang, Di et al.; Sorption of perfluorooctanoic acid, perfluorooctane sulfonate and perfluoroheptanoic acid on granular activated carbon; Chemosphere, Elsevier Ltd.; Nov. 21, 2015; 7 pages.
Zhang, Weilan et al.; Environmental factors affecting degradation of perfluorooctanoic acid (PFOA) by In2O3 nanoparticles; Journal of Environmental Sciences, Elsevier B.V.; Apr. 4, 2020; 9 pages.
Zhang, Weilan et al.; Nanotechnology in remediation of water contaminated by poly- and perfluoroalkyl substances: A review; Environmental Pollution, Elsevier Ltd.; Jan. 11, 2019; 11 pages.
Zhang, Weilan et al.; Removal of eight perfluoroalkyl acids from aqueous solutions by aeration and duckweed; Science of the Total Environment, Elsevier B.V.; Mar. 31, 2020; 9 pages.
Zhao, Baoxiu et al.; Photocatalytic degradation of perfluorooctanoic acid with ß-Ga2O3 in anoxic aqueous solution; Journal of Environmental Sciences, ScienceDirect; 2012; pp. 774-780.
Zhuo, Qiongfang et al.; Electrochemical oxidation of PFOA in aqueous solution using highly hydrophobic modified PbO2 electrodes; Journal of Electroanalytical Chemistry, Elsevier B.V.; Jul. 12, 2017; 9 pages.

\* cited by examiner

SYSTEM AND METHOD FOR REMOVAL OF PFAS AND OTHER EMERGING CONTAMINANT MICRO-CONSTITUENTS FROM LANDFILL LEACHATE AND OTHER IMPACTED LIQUIDS

BACKGROUND

1. Related Applications

This application claims the benefit, and priority benefit, of U.S. Provisional Patent Application Ser. No. 63/093,421, filed Oct. 19, 2020, the disclosure and contents of which are incorporated by reference herein in their entirety.

2. Field of the Invention

The presently disclosed subject matter relates generally to removal of undesired chemicals from industrial waste streams, and more specifically, to removal of per- and poly-fluoroalkyl substances (PFAS) and other emerging contaminant micro-constituents from leachate treatment waste streams.

3. Description of the Related Art

In recent years, there has been an increased interest in studying the effects of per- and poly-fluoroalkyl substances on humans. These substances (often referred to as "PFAS") are manufactured chemicals that can be found in various consumer and industrial products.

PFAS are sometimes referred to as "forever chemicals" because the molecules are characterized by a chain of strong fluorine-carbon bonds which result in a highly stable and long persisting chemical. It is believed that long term human exposure to PFAS can increase the risk of cancer, increase cholesterol levels, affect the immune system, and interfere with hormone levels.

It is known in the art to use various treatment efforts to attempt to remove these per- and poly-fluoroalkyl substances from industrial waste streams. However, many of these previous treatment efforts have proven to be cost prohibitive and inefficient, and have not provided satisfactory results.

For example, some conventional treatment approaches use adsorptive media such as granular activated carbon, natural zeolites, or ion exchange media to encounter the micro-constituent of interest in order to remove it from the bulk liquid. In the case of landfill leachate, the bulk liquid contains many constituents that may interfere with the adsorption process through physical and/or chemical mechanisms. Additionally, the micro-constituent concentration can be hundreds of orders of magnitude lower than other constituents in the landfill leachate and/or impacted landfill liquids.

In particular, organic molecules (grossly referred to and non-specifically measured as total organic carbon) can cause significant interference with the adsorptive media. This interference results in decreased removal efficiency, reduced micro-constituent assimilative capacity, accelerated exhaustion, increased media usage and higher operational costs in order to achieve the desired micro-constituent removals and effluent concentrations.

Improvements in this field are therefore desired.

SUMMARY

Various illustrative embodiments of a system and method for removing PFAS from residual waste streams generated during the processing of landfill liquids prior to disposal are disclosed herein.

In certain illustrative embodiments, a method for removing per- and poly-fluoroalkyl substances (PFAS) from an initial waste stream is provided. The initial waste stream comprising per- and poly-fluoroalkyl substances can be introduced into a primary treatment module, wherein the primary treatment module is configured to remove particulate and colloidal organic matter from the initial waste stream using one or more of chemical coagulation and flocculation followed by one or more of solids separation and straight filtration, to produce an effluent stream. The effluent stream can be introduced into a secondary treatment module comprising an adsorptive organic/clay based material. The secondary treatment module can produce a treated waste stream that is substantially devoid of per- and poly-fluoroalkyl substances, wherein no removal of organic carbon from the waste stream is performed between the primary treatment module and the secondary treatment module. The initial waste stream can be a leachate treatment stream. The treated waste stream can have an aggregate concentration for per- and poly-fluoroalkyl substances of 17 ng/L or less after continuous processing for about 83 days.

In certain illustrative embodiments, a method of removing per- and poly-fluoroalkyl substances (PFAS) from an initial waste stream is provided. The initial waste stream comprising per- and poly-fluoroalkyl substances can be introduced into a primary treatment module, wherein the primary treatment module is configured to remove particulate and colloidal organic matter from the initial waste stream using one or more of chemical coagulation and flocculation followed by one or more of solids separation and straight filtration, to produce a primary effluent stream. The primary effluent stream can be introduced into a secondary treatment module comprising an adsorptive organic/clay based material to produce a secondary effluent stream. The secondary effluent stream can be introduced into a tertiary treatment module comprising a reverse osmosis filtration unit to produce a treated waste stream. The treated waste stream can be substantially devoid of per- and poly-fluoroalkyl substances, and no removal of organic carbon from the waste stream is performed between the primary treatment module and the secondary treatment module. The initial waste stream can be a leachate treatment stream. The treated waste stream can have an aggregate concentration for per- and poly-fluoroalkyl substances of 17 ng/L or less after continuous processing for about 83 days.

BRIEF DESCRIPTION OF THE DRAWINGS

A better understanding of the presently disclosed subject matter can be obtained when the following detailed description is considered in conjunction with the drawings and figures herein, wherein.

Figure 1A:
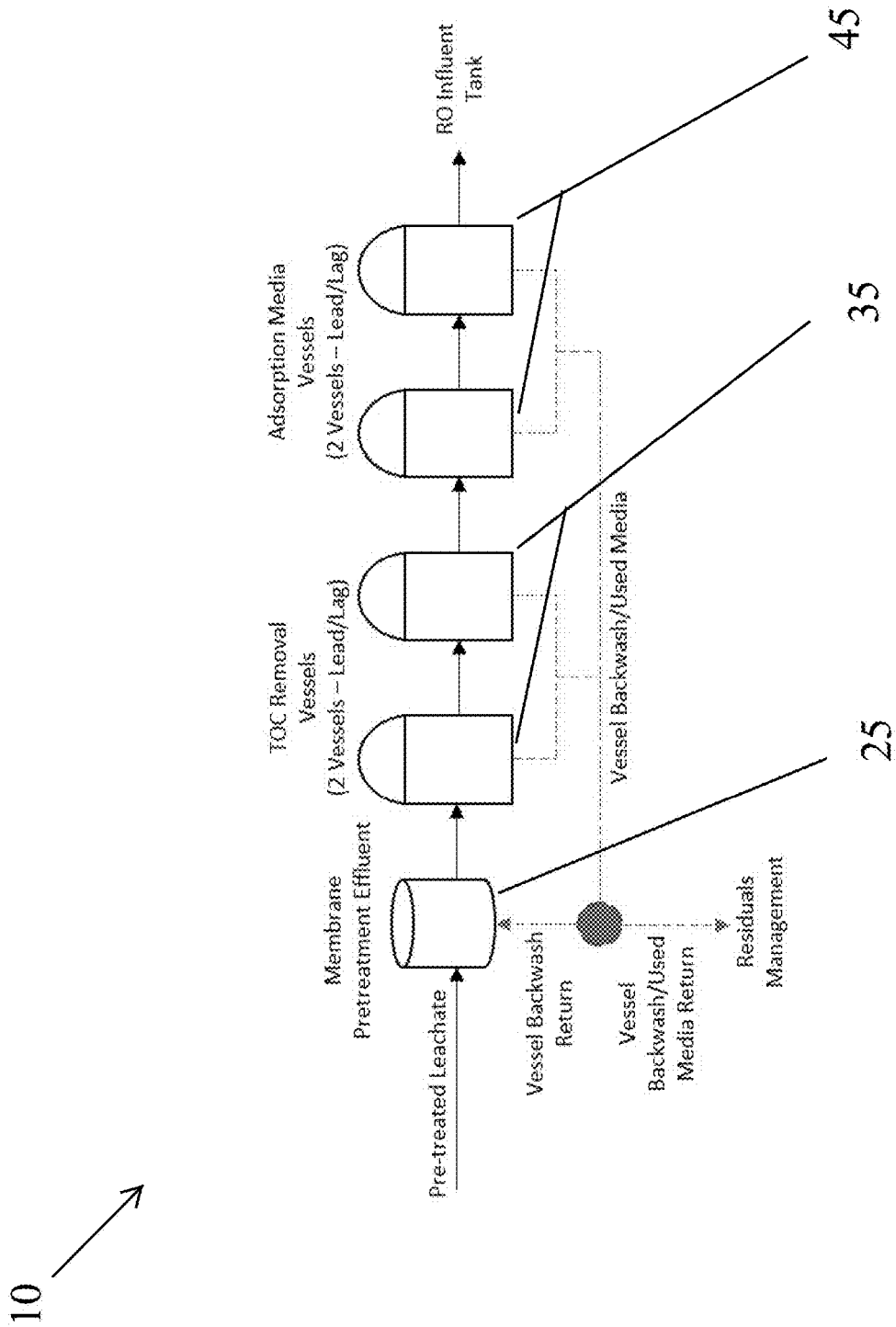
FIG. 1A is a flow diagram of an illustrative system and method with membrane pretreatment according to embodiments of the present disclosure.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

Various illustrative embodiments of a system and method for removing PFAS from residual waste streams generated during the processing of landfill liquids prior to disposal are described herein.

An example of a landfill liquid is leachate. Landfill leachate can contain dissolved or entrained environmentally harmful substances such as PFAS and other emerging contaminant micro-constituents that may enter the environment if not properly treated.

In certain illustrative embodiments, the presently disclosed system and method can improve the removal of PFAS and other emerging contaminant micro-constituents in landfill leachate and/or landfill impacted liquids (including stormwater and contaminated groundwater).

In certain illustrative embodiments, the system and method can include a microconstituent (i.e., PFAS) treatment with upfront biological treatment at a landfill site. For example, an on-site leachate treatment plant (LTP) can utilize a membrane bioreactor (MBR) and reverse osmosis (RO) to facilitate microconstituent (i.e., PFAS) reduction. The treatment approach can be utilized on landfill sites that deploy some form of on-site leachate treatment achieving significant biodegradable organics and suspended solids (TSS) removal.

In certain illustrative embodiments, the presently disclosed system and method can include a number of physical and chemical treatment unit processes operated in series that are intended to improve the removal of micro-constituents in landfill leachate and/or landfill impacted liquids (including stormwater and contaminated groundwater). For example, in certain illustrative embodiments, the presently disclosed system and method can provide gross particulate removal via solids coagulation and precipitation and/or bag or cartridge filtration, followed by organic carbon removal using granular activated carbon or other organic compound assimilative media as needed, and then followed by a micro-constituent selective media. In certain illustrative embodiments, the system and method can be applied to untreated liquids and/or liquids that have been previously processed through biological treatment where additional removal of suspended particulates and/or organic constituents that are grossly typically defined as, and/or measured as, total organic carbon is required to improve overall micro-constituent removal.

Additionally, in certain illustrative embodiments, membrane filtration can serve as a pre-filtration process ahead of the adsorptive media to remove solids and colloidal organic molecules that could blind media adsorption sites thereby reducing the PFAS removal capacity and increasing media usage/replacement rates and/or accumulate in the voids spaces, slowing the flow or causing channeling with the media bed, thus leading to an increase frequency of media bed backwashing.

Figure 1B:
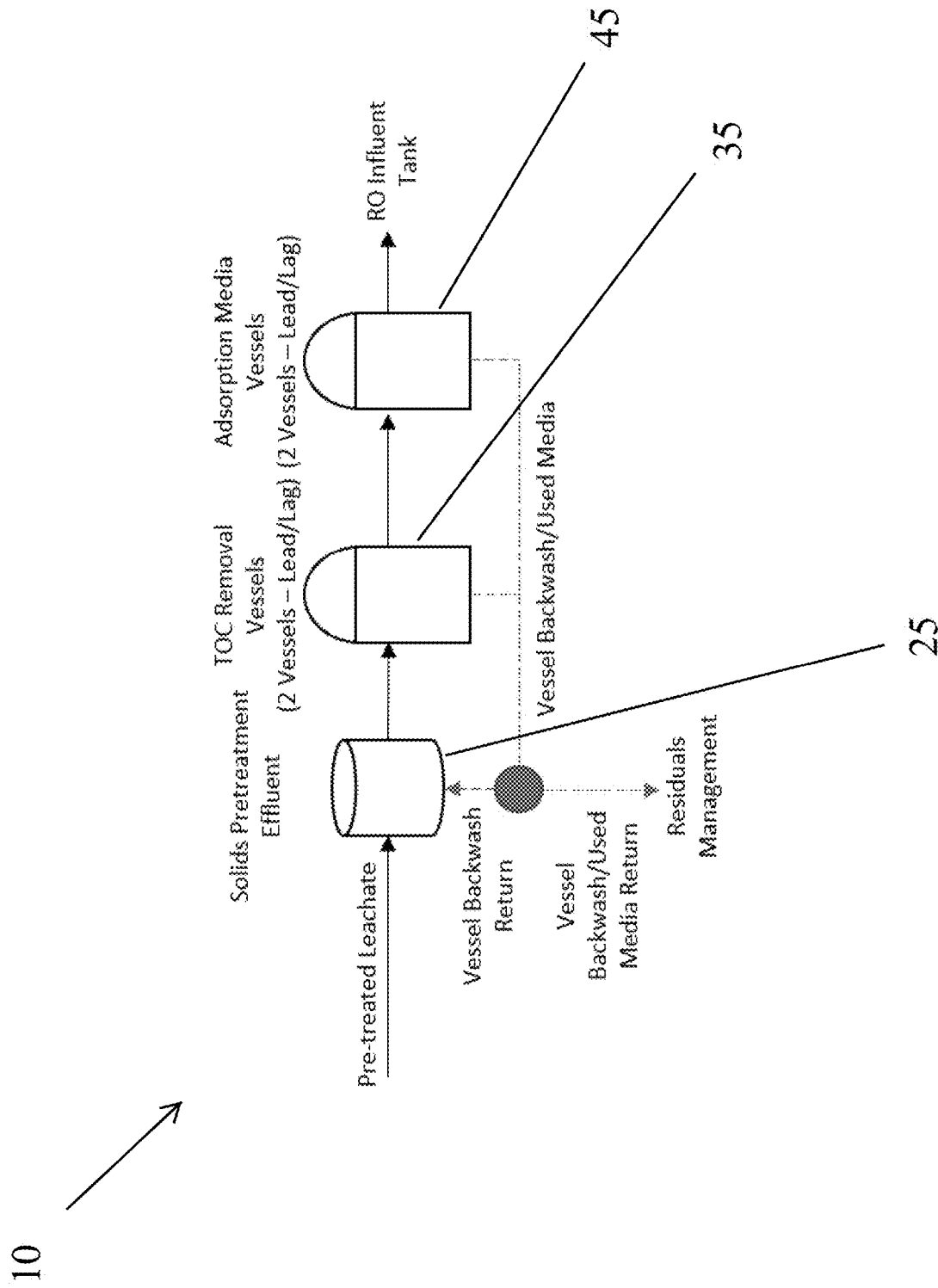
FIG. 1B is a flow diagram of an illustrative system and method with solids pretreatment according to embodiments of the present disclosure.

Illustrative embodiments of a system 10 for removing per- and poly-fluoroalkyl substances (PFAS) and other micro-constituents from a waste stream are shown in FIGS. 1A and 1B. The waste stream can be, for example, a leachate stream that has been pre-treated.

Referring now to FIGS. 1A and 1B, the system 10 can include a first treatment module (not shown) that is configured to perform a combination of chemical coagulation and flocculation to remove particulate and colloidal organic matter, followed by solids separation and/or direct filtration (media, bag, screen, membrane). The resulting material is delivered to a pretreatment effluent tank 25. In FIG. 1A, the pretreatment effluent tank 25 stores membrane pretreatment effluent, while in FIG. 1B, the pretreatment effluent tank 25 stores solids pretreatment effluent. The system 10 can also include a second treatment module 35 that receives the materials from pretreatment effluent tank 25, and that comprises one or more granular activated carbon (GAC) vessels configured to perform additional removal of total organic carbon (TOC). In embodiments where two vessels are utilized (see, e.g., FIG. 1A), a lead/lag orientation can be implemented. The system 10 can also include a third treatment module 45 comprising one or more of: (i) an adsorptive media treatment (see FIG. 1A and FIG. 1B) such as specialty GAC or organic/clay materials with or without physical/chemical surface modifications and configured to enhance micro-constituent constituent removal; and (ii) an ion exchange media resin treatment (not shown) configured to provide targeted micro-constituent removal. In embodiments where two vessels are utilized (see, e.g., FIG. 1A), a lead/lag orientation can be implemented. The embodiments of FIG. 1A and FIG. 1B each utilize a two vessel, lead/lag configuration, but are displayed differently for purposes of illustration herein. The product from the third treatment module 45 can be delivered to an RO influent tank (not shown) for further downstream treatment, or discharged for final disposal.

In accordance with FIG. 1A and FIG. 1B, a method (corresponding to system 10) for removing per- and poly-fluoroalkyl substances (PFAS) and other microconstituents from a waste stream is also provided. In certain illustrative embodiments, previously untreated liquids can be collected and transferred through a series of treatment steps. First, an initial treatment step is performed in a first treatment module (not shown) whereby particulate and colloidal organic matter is removed using a combination of chemical coagulation and flocculation followed by solids separation and/or straight filtration (media, bag, screen, membrane) and then delivered to a pretreatment effluent tank 25. Second, the effluent steam from step one is pumped through a second treatment module 35 wherein one or more granular activated carbon (GAC) vessels facilitate additional removal of total organic carbon (TOC). Third, the GAC effluent is processed through a third treatment module 45 comprising one or more of: (i) an adsorptive media such as specialty GAC or organic/clay materials with or without physical/chemical surface modifications to enhance micro-constituent constituent removal; and (ii) an ion exchange media resin for targeted micro-constituent removal. In embodiments where two vessels are utilized, a lead/lag orientation can be implemented. Finally, the effluent from the third treatment module 45 is delivered to an RO influent tank (not shown) for further downstream treatment, or discharged for final disposal.

Figure 2A:
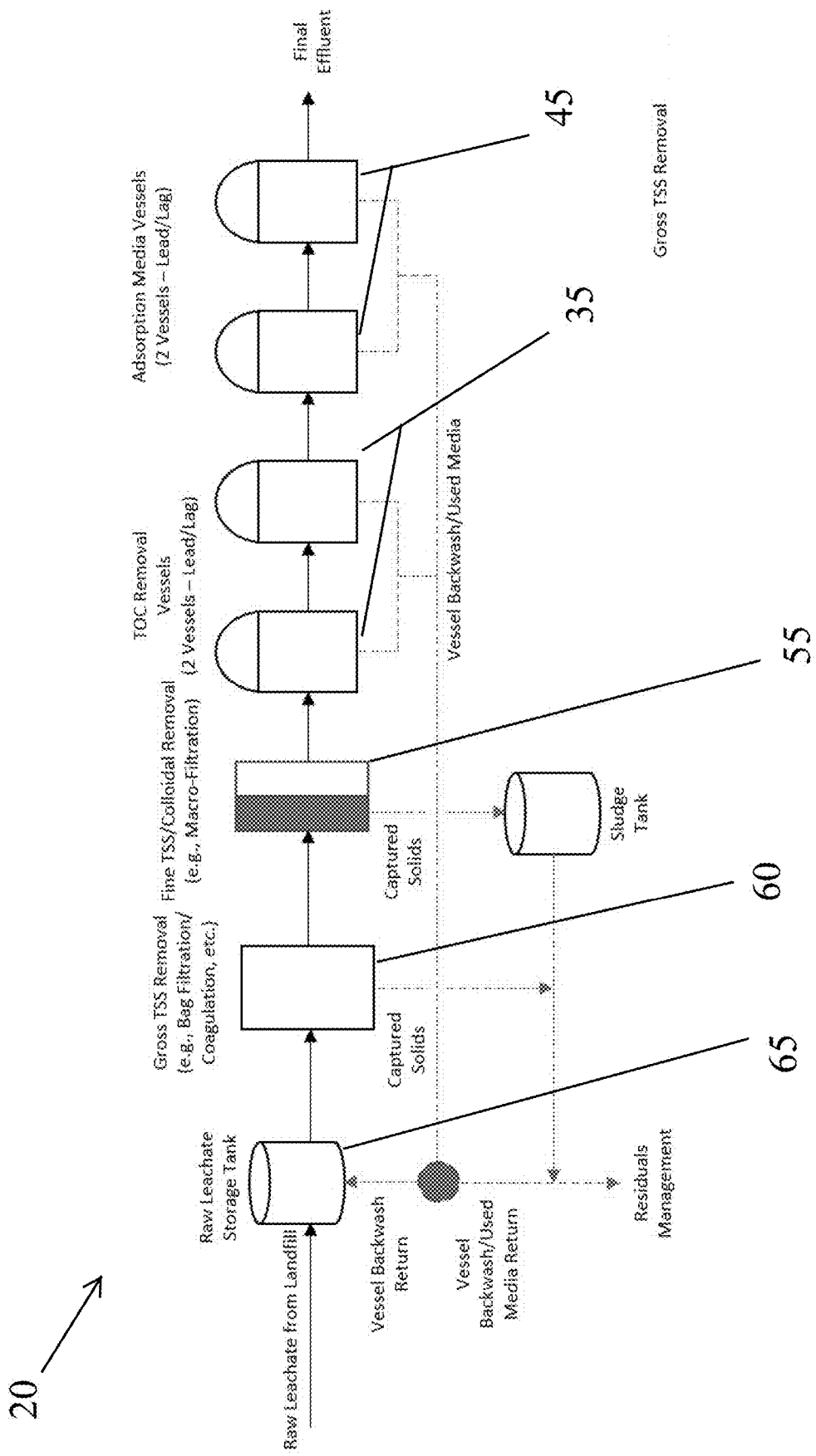
FIG. 2A is a flow diagram of an illustrative system and method with dual TOC removal vessels and adsorption media vessels according to embodiments of the present disclosure.
Figure 2B:
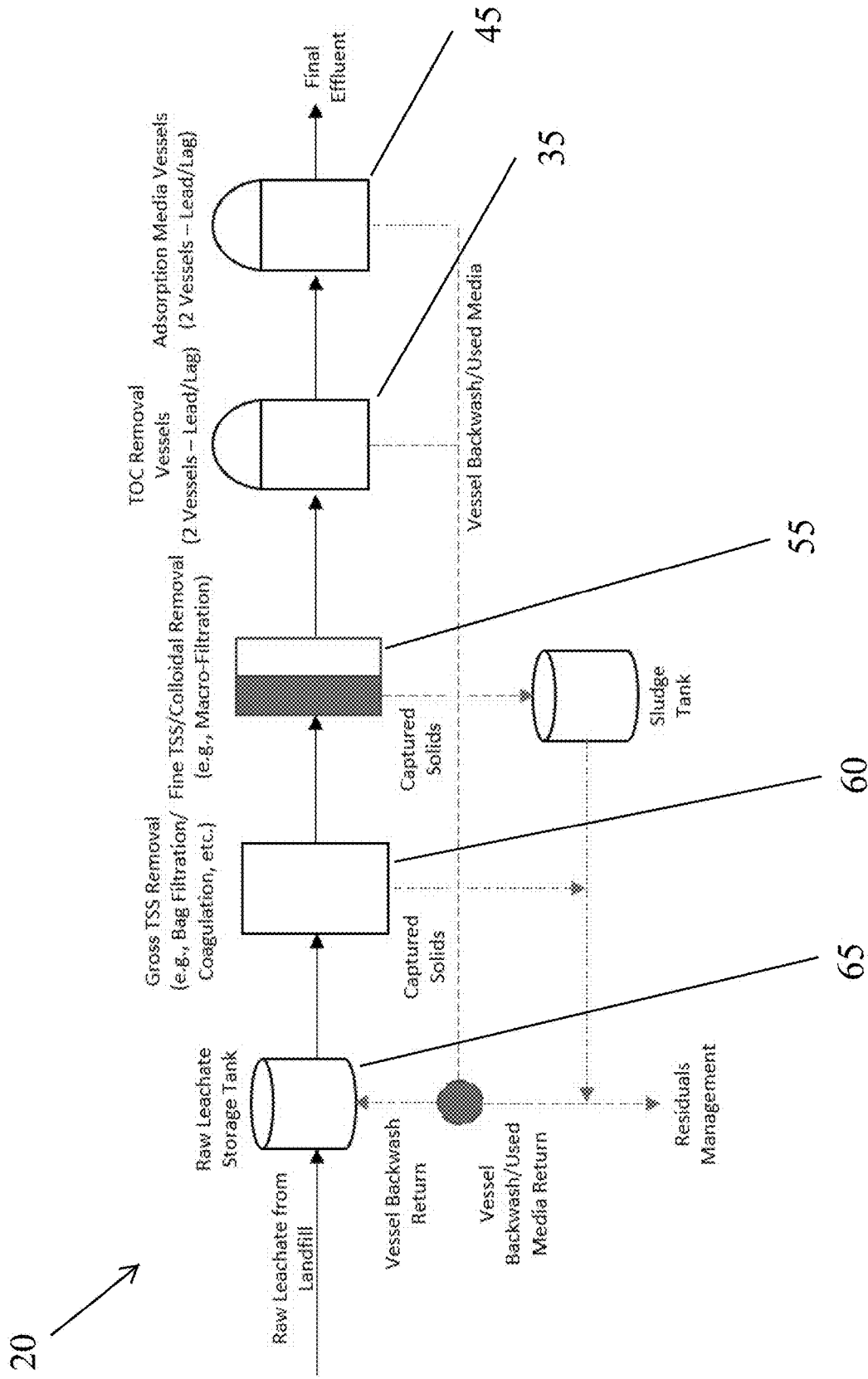
FIG. 2B is a flow diagram of an illustrative system and method with single TOC removal and adsorption media vessels according to embodiments of the present disclosure.

Another illustrative embodiment of a system 20 for removing per- and poly-fluoroalkyl substances (PFAS) and other microconstituents from a waste stream is shown in FIG. 2A and FIG. 2B. The system 20 includes a PFAS and other microconstituent treatment for raw leachate that is low strength and not needing biological treatment. This treatment approach can address treatment needs for low strength raw leachate at sites that do not operate on-site LTPs.

Referring now to FIG. 2A and FIG. 2B, the system 20 can include a raw leachate storage tank 65 for storing raw leachate from a landfill. The raw leachate can be fed to a series of TSS removal steps including a gross TSS removal vessel 60 that can be, e.g., bag filtration or coagulation and/or a fine TSS/colloidal removal vessel 55 that can comprise, e.g., macro-filtration. The product of these one or more TSS removal steps can be delivered to a second treatment module 35 comprising one or more granular activated carbon (GAC) vessels configured to perform additional removal of total organic carbon (TOC). In embodiments where two vessels are utilized (see, e.g., FIG. 2A), a lead/lag orientation can be implemented. The embodiments of FIG. 2A and FIG. 2B each utilize a two vessel, lead/lag configuration, but are displayed differently for purposes of illustration herein. The system 20 can also include a third treatment module 45 to receive the materials from second treatment module 35 and comprising one or more of: (i) an adsorptive media treatment such as specialty GAC or organic/clay materials with or without physical/chemical surface modifications and configured to enhance micro-constituent constituent removal; and (ii) an ion exchange media resin treatment configured to provide targeted micro-constituent removal. In embodiments where two vessels are utilized, a lead/lag orientation can be implemented. A product of the third treatment module 45 is a treated final effluent stream that is substantially devoid of PFAS and emerging contaminant microconstituents.

In accordance with FIG. 2A and FIG. 2B, a method (corresponding to system 20) for removing per- and poly-fluoroalkyl substances (PFAS) and other microconstituents from a waste stream is also provided. In certain illustrative embodiments, liquids can be collected and transferred through a series of treatment steps. First, an initial treatment step is performed in a first treatment module 25 whereby captured solids are removed using a combination of gross TSS removal and fine TSS/colloidal removal. Second, the effluent steam from step one is pumped through a second treatment module 35 wherein one or more granular activated carbon (GAC) vessels for additional removal of total organic carbon (TOC). Third, the GAC effluent is processed through a third treatment module 45 comprising one or more of: (i) an adsorptive media such as specialty GAC or organic/clay materials with or without physical/chemical surface modifications to enhance micro-constituent constituent removal; and (ii) an ion exchange media resin for targeted micro-constituent removal. In embodiments where two vessels are utilized (see, e.g., FIG. 2A), a lead/lag orientation can be implemented. Finally, the effluent from the third treatment module 45 is discharged for final disposal.

Figure 3:
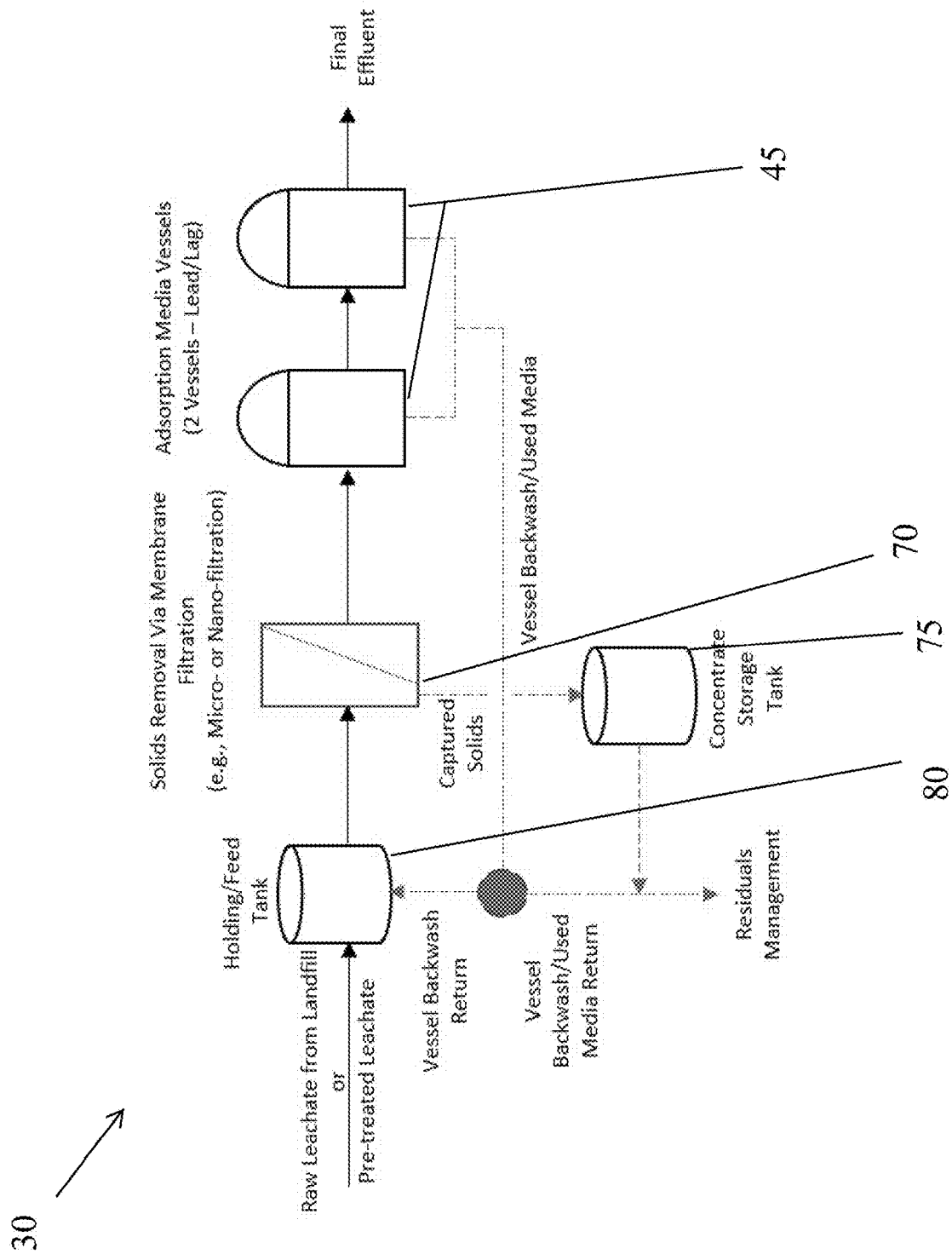
FIG. 3 is a flow diagram of an illustrative system and method with membrane filtration followed by adsorption according to embodiments of the present disclosure.

Another illustrative embodiment of a system 30 for removing per- and poly-fluoroalkyl substances (PFAS) and other microconstituents from a waste stream is shown in FIG. 3. The system 30 can include a holding tank 80 for storing raw leachate from a landfill and/or pretreated leachate. The leachate from the holding tank 80 can be fed to a solids removal vessel 70 that can perform solids removal via membrane filtration (e.g., nano- or micro-filtration) on the leachate. The captured solids can be stored in a concentrate storage tank 75, while the product stream can be delivered to a treatment module 45 comprising one or more of: (i) an adsorptive media treatment such as specialty GAC or organic/clay materials with or without physical/chemical surface modifications and configured to enhance micro-constituent constituent removal (see FIG. 3); and (ii) an ion exchange media resin treatment (not shown) configured to provide targeted micro-constituent removal. In embodiments where two vessels are utilized (see, e.g., FIG. 3), a lead/lag orientation can be implemented. The product of the treatment module 45 is a treated effluent stream that is substantially devoid of PFAS and emerging contaminant microconstituents.

In accordance with FIG. 3, a method (corresponding to system 30) for removing per- and poly-fluoroalkyl substances (PFAS) and other microconstituents from a waste stream is also provided. In certain illustrative embodiments, liquids can be collected and transferred through a series of treatment steps. First, leachate from, e.g., a holding tank, can be fed to a solids removal vessel 70 that can perform solids removal via membrane filtration (e.g., nano- or micro-filtration) on the leachate. The captured solids can be stored in a concentrate storage tank 75, while the product stream can be delivered to a treatment module 45 comprising one or more of: (i) an adsorptive media treatment such as specialty GAC or organic/clay materials with or without physical/chemical surface modifications and configured to enhance micro-constituent constituent removal; and (ii) an ion exchange media resin treatment configured to provide targeted micro-constituent removal. In embodiments where two vessels are utilized, a lead/lag orientation can be implemented. The product of the treatment module 45 is a treated effluent stream that is substantially devoid of PFAS and emerging contaminant microconstituents.

Importantly, in certain illustrative embodiments, the system 30 and corresponding method of FIG. 3 do not include removal of total organic carbon (TOC) in a TOC removal vessel prior to adsorption.

Figure 4:
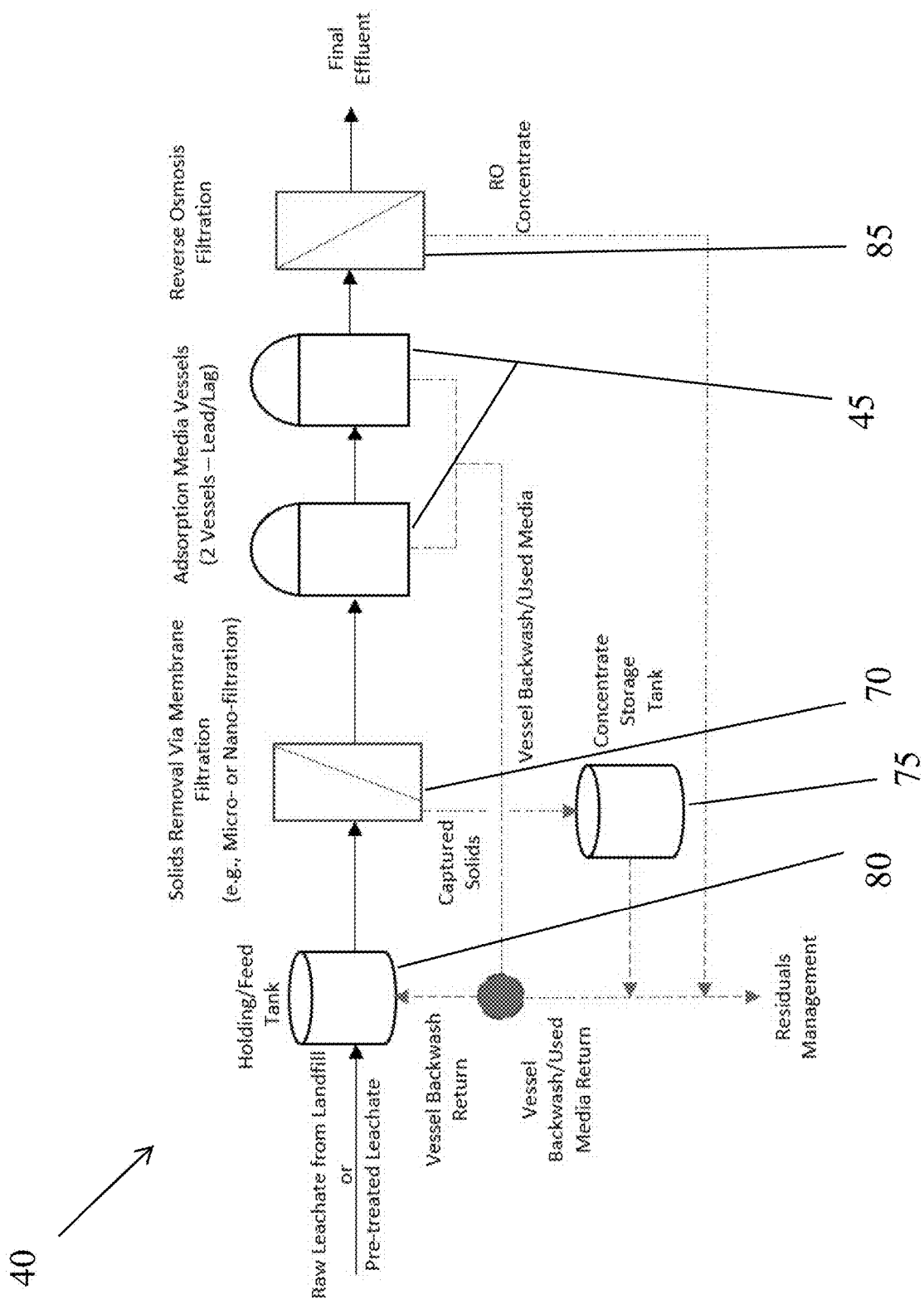
FIG. 4 is a flow diagram of an illustrative system and method with membrane filtration followed by adsorption and reverse osmosis according to embodiments of the present disclosure.

Another illustrative embodiment of a system 40 for removing per- and poly-fluoroalkyl substances (PFAS) and other microconstituents from a waste stream is shown in FIG. 4. This approach also does not include removal of total organic carbon (TOC) in a TOC removal vessel prior to adsorption. As with FIG. 3, the approach of FIG. 4 allows for more efficient sequestering and encapsulation of the PFAS on the adsorbent media as compared to adsorption of the PFAS from the RO concentrate and then attempting to encapsulate the media or even solidification of the RO concentrate.

In certain illustrative embodiments, system 40 allows for removal of PFAS and other micro-constituents between solids removal processes and facilitates adsorptive media targeted removal rather than universally concentrating all constituents into a single stream and then attempting PFAS removal and/or destruction within the concentrated stream. It is believed that other micro-constituents (in addition to PFAS) where a selective media could be used would also benefit from this approach as compared to conventional strategies.

In certain illustrative embodiments, system 40 allows for targeted removal of PFAS or other micro-constituents which can be effectively achieved as compared to attempting removal of the PFAS from the stream in the presence of higher concentrations of non-target constituents that reduce the effective of PFAS selective processes. PFAS removal upstream of a reverse osmosis (RO) treatment process mitigates the accumulation of PFAS in the residual concentrate stream thereby facilitating disposal of the liquid in situations when elevated PFAS concentrations would prevent convenient disposal. PFAS removal upstream of a RO process also mitigates the accumulation of PFAS in the residual concentrate stream to concentrations that could trigger future RCRA hazardous waste classification.

In accordance with FIG. 4, a method (corresponding to system 40) for removing per- and poly-fluoroalkyl substances (PFAS) and other microconstituents from a waste stream is also provided. In certain illustrative embodiments, liquids can be collected and transferred through a series of treatment steps. First, leachate from, e.g., a holding tank 80, can be fed to a solids removal vessel 70 that can perform solids removal via membrane filtration (e.g., nano- or micro-filtration) on the leachate. The captured solids can be stored in a concentrate storage tank 75, while the product stream can be delivered to a treatment module 45 comprising one or more of: (i) an adsorptive media treatment (see, e.g., FIG. 4) such as specialty GAC or organic/clay materials with or without physical/chemical surface modifications and configured to enhance micro-constituent constituent removal; and (ii) an ion exchange media resin treatment (not shown) configured to provide targeted micro-constituent removal. In embodiments where two vessels are utilized, a lead/lag orientation can be implemented. The product of the treatment module 45 is sent to a reverse osmosis filtration module 85 for further treatment. The product of the reverse osmosis filtration module 85 is a treated effluent stream that is substantially devoid of PFAS and emerging contaminant microconstituents.

FIGS. 1-4 herein illustrate exemplary systems and methods with a plurality of sequential, non-sequential, or sequence independent "steps" using the equipment shown or described herein. It should be noted that the system and method of FIGS. 1-4 are exemplary and may be performed in different orders and/or sequences as dictated or permitted by the equipment described herein, and any alternative embodiments thereof. Numerous arrangements of the various "steps" and equipment can be utilized. In addition, not all "steps" or equipment described herein need be utilized in all embodiments. However, it should be noted that certain particular arrangements of equipment and/or "steps" for the system and method as described herein are materially distinguishable from and provide distinct advantages over previously known technologies.

Experimental Testing

Given concerns with typical high strength landfill leachate matrices and their impact on media-based technologies that serve as polishing steps to treat microconstituents such as PFAS, bench testing was initially conducted on raw leachate from an on-site leachate treatment plant and reverse osmosis concentrate. In order to validate the performance impacts on untreated landfill leachate, further bench testing was conducted to assess the effectiveness of carbon media in pretreating leachate for bulk organic carbon removal and achieving gross PFAS reduction, in accordance with the presently disclosed systems and methods. The bench testing demonstrated promising results for PFAS reduction using adsorption media.

Three different media types were evaluated in a bench-scale adsorbent isotherm test. The media evaluated included: (i) granular activated carbon; (ii) an exchange media (Evoqua PSR2+ and DEXSORB®+); and (iii) an organic clay-based product (CETCO FluoroSorb®)

At the completion of the reaction time (24 hours), total PFAS and PFOA concentrations of the bulk solution from each reactor was measured and equilibrium adsorption modeling for each media was calculated.

Modeling results are shown in Table 1 below:

TABLE 1

Raw leachate equilibrium adsorption modeling results

| | PFOA | | | | | PFAS | | | | |
|---|---|---|---|---|---|---|---|---|---|---|
| Adsorbent | $K_f$ | $1/n$ | Qmax (µg/g) | $C_{10}$ (µg/L) | %-Rem at $C_{10}$ | $K_f$ | $1/n$ | Qmax (µg/g) | $C_{10}$ (µg/L) | %-Rem at $C_{10}$ |
| Calgon F400 | $2.2 \times 10^{-4}$ | 0.021 | 0.22 | 0.73 | 75% | $6.1 \times 10^{-4}$ | 0.243 | 1.3 | 11.6 | 49% |
| CETCO FluoroSorb | $8.3 \times 10^{-4}$ | 0.380 | 1.2 | 0.12 | 96% | $6.3 \times 10^{-4}$ | 0.701 | 5.6 | 5.46 | 76% |
| Evoqua PSR2+ | $7.9 \times 10^{-4}$ | 0.268 | 1.0 | <0.69 | >76% | $2.6 \times 10^{-3}$ | 0.279 | 6.2 | 1.23 | 95% |
| CRC Care MatCare | $4.0 \times 10^{-4}$ | 0.649 | 0.8 | 0.57 | 80% | $2.2 \times 10^{-6}$ | 2.48 | 4.5 | 12.8 | 43% |

Notes:
Initial concentration of PFOA = 2.9 µg/L; initial concentration off all measured PFAS = 22.5 µg/L
Qmax = calculated maximum adsorption capacity using Freundlich equilibrium model parameters
$C_{10}$ is the equilibrium effluent concentration remaining in the leachate at 10 g/L adsorbent dose (maximum dose tested)

These results show that the CETCO FluoroSorb® achieved the highest PFOA specific removal rate (Qmax=1.2 ug/g) and demonstrated similar total PFAS removal when compared to Evoqua PSR2+ which achieved 6.2 ug/g whereas the FluoroSorb® achieved a 5.6 ug/g. This suggested that the media was least impacted by other constituents in the leachate and thus indicating that under some conditions, organic carbon removal may not be needed.

In conjunction with the previous testing, removal/destruction of the PFAS from RO concentrate was also evaluated in bench-scale tests to evaluate the potential of electro-chemical oxidation process for this application. A series of batch studies were conducted in which different treatment conditions were applied to determine potential optimum operating conditions to achieve the highest PFAS removal performance. The results demonstrated that the technology could achieve levels of PFAS removal, but did not achieve the treatment goals of 56 ng/L for the aggregated total concentration of 4 target constituents after 40 hours of reaction time as demonstrated in the results. As such, this particular strategy is considered not to be a viable approach at the observed treatment times for large scale commercial implementation for RO concentrate associated with processing landfill leachate.

Large-scale pilot testing of the presently disclosed system and method was conducted to confirm the observations of the bench-scale equilibrium testing. Biologically treated, membrane (ultra-filtration) filtered leachate was continuously processed through different media vessel configurations that included: Scenario 1—Vessels 1 and 2 contained GAC and Vessel 3 contained ion exchange media, and Scenario 2—Vessels 1 and 2 contained FluoroSorb®. For these evaluations, the treatment goal was 56 ng/L as the aggregate concentration of 6 selected PFAS constituents— PFHpA, PFOA, PFNA, PFDA, PFHxS, and PFOS.

Under the Scenario 1 configuration, the treatment goal (<target concentration of 56 ng/L) was achieved for approximately 2 days. On day 3, the treatment goal for the final effluent (discharge from Vessel 3) was surpassed by approximately 1 ng/L for the aggregate concentration of the 6 target PFAS compounds.

Under the Scenario 2 configuration, on day 83 the effluent from FluoroSorb® in Vessel 2 final effluent possessed an aggregate concentration for the 6 target PFAS compounds of 17 ng/L (target concentration was <56 ng/L). The effluent concentration (from the lead vessel) of the same 6 target constituents was 670 ng/L and could be allowed to go up higher to maximize constituent loading on the media in the lead column. The vessels were operated at typical operating conditions for the type of media used, with only a marginal change in pressure increase (<2 psi) across the entire system. This suggests that there was little or no buildup of material within the media beds, and thus we did not conduct any backwashing or other media bed maintenance during this evaluation period.

Results are shown in Table 3 below:

TABLE 3

Large pilot-scale evaluation of results of GAC followed by ion exchange resin removal of 6 target PFAS constituents

| Day of Study | UFP Influent (ng/L) | GAC#2 Effluent (ng/L) | IXR Effluent (ng/L) |
| --- | --- | --- | --- |
| 1 | 13,010 | <1.77 | <1.81 |
| 2 | — | 2304.5 | 34.9 |
| 3 | — | 2964.3 | 56.7 |
| 4 | — | 4362 | 155.4 |

It was believed that non-specific/unidentified organic constituents collectively referred to and measured as TOC would interfere with the specialty media and reduce the affinity and/or removal capacity for adsorption or ion exchange, and that the GAC would serve as a sacrificial media sponge to remove the TOC and improve the performance of the media. However, the tested media achieved significantly longer service life and higher removal capacity without the need to remove the TOC. Based on the significant performance improvement, the study was ended and a full-scale demonstration system was installed and continues to be operated.

The presently disclosed system and method have a number of advantages over prior art technologies. For example, existing technologies using adsorption media-based systems offer direct application of their technology for PFAS reduction. However, the often-high strength concentrations and complexed matrix observed in landfill liquids (combination of organics and inorganics) results in inefficient performance of these technologies (especially adsorption-based media systems) thereby requiring some level of pretreatment to limit/minimize competing ions for media adsorption sites and allowing for more enhanced/efficient microconstituent (i.e. PFAS) removal. Further, existing technologies for micro-constituent(s) (i.e. PFAS or other emerging contaminants) have principally been demonstrated on water/wastewater matrices that are not as complex as landfill leachate and leachate impacted liquids. The chemical makeup and the relative concentrations of the different constituents in leachate have proven to be challenging for technologies developed to remove micro-constituents from less-complex matrices such as groundwater.

The presently disclosed system and method improve micro-constituent removal efficiency, extend media service-life, and reduce operational costs. In certain illustrative embodiments, the system and method described herein utilize two adsorptive media such as activated carbon or other media that will target organic molecules (grossly defined as total organic carbon) followed by targeted media for the removal of micro-constituents such as PFAS or other emerging contaminants.

In addition, the presently disclosed system and method improve the removal performance of micro-constituents in landfill leachate and other impacted liquids. Conventional treatment approaches use adsorptive media such as granular activate carbon, natural zeolites or ion exchange media to encounter the micro-constituent of interest in order to remove it from the bulk liquid. In the case of landfill leachate, the bulk liquid contains many constituents that may interfere with the adsorption process through physical and/or chemical mechanisms. Additionally, the micro-constituent concentration can be hundreds of orders of magnitude lower than other constituents in the landfill leachate and/or impacted landfill liquids. In particular, organic molecules (grossly referred to and non-specifically measured as total organic carbon) can cause significant inference to the adsorptive media. This interference results in lowered removal efficiency, reduced micro-constituent assimilative capacity, reduced time to exhaustion, increased media usage, and higher operational costs, in order to achieve desired micro-constituent removals and effluent concentrations.

By comparison, the presently disclosed system and method seek to reduce the organic (particulate and dissolved molecules) component concentrations in the bulk liquid prior to processing the leachate and/or landfill impact liquids using a media that is selective for a specific micro-constituent. This way, the presently disclosed system and method will reduce the potential interferences of the selective media to improve performance of the media.

Additionally, a process such as reverse osmosis (RO) concentrates all retained constituents (including PFAS constituents) into a small (relative to the primary bulk RO permeate flow) residual stream that will require subsequent disposal at a considerable expense. Alternatively, in theory the smaller more highly concentrated PFAS volume more readily facilitates the application of PFAS destruction technologies. However, given the retention of non-PFAS constituents in the RO residual, destructive technologies at the present time are not able to achieve low double digit PFAS concentrations in the final effluent at economically viable levels.

In certain illustrative embodiments, the presently disclosed system and method is effective for removing and destroying specific emerging contaminant microconstituents that may be potentially concentrated in residual waste streams generated during the processing of the landfill liquids. In other words, these microconstituents can be removed and destroyed in addition to any PFAS that are removed and destroyed using the presently described technology.

Certain existing leachate pretreatment systems allow raw leachate to flow into a storage tank and then get pumped into a treatment system that consists of, e.g., biological treatment followed by an ultra-filtration (UF) member system. Permeate from the UF membrane can be pumped through a reverse osmosis (RO) system to polish the permeate and meet discharge requirements. To the extent that PFAS would need to be removed from the RO concentrate, various technologies (e.g., electro-chemical oxidation and ion exchange specialty media) could achieve some removal, but do appear to be economically viable or sustainable for targeting low levels (<50 ng/L).

In certain illustrative embodiments, the presently disclosed system and method is effective for preventing the PFAS from getting into the RO concentrate, which is beneficial because the RO concentrate will have other constituents that make it difficult for PFAS specific removal or destruction for targeting low levels. The presently disclosed system and method can target PFAS removal between UF (where there is a solids free liquid) and RO membranes.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A method of removing per- and poly-fluoroalkyl substances (PFAS) from a leachate stream, the method comprising:
    introducing the leachate stream comprising per- and poly-fluoroalkyl substances into a primary treatment module, wherein the primary treatment module comprises a solids removal vessel that is configured to remove solids from the leachate stream using membrane filtration and produce an effluent stream; and
    passing the effluent stream directly from the solids removal vessel into a secondary treatment module comprising an adsorptive organic/clay based material and configured to adsorb microconstituents from the effluent stream,
    wherein there is no removal of total organic carbon (TOC) in a TOC removal vessel prior to adsorption occurring in the secondary treatment module,
    and wherein the secondary treatment module produces a treated leachate stream that is substantially devoid of per- and poly-fluoroalkyl substances.

2. The method of claim 1, wherein the membrane filtration is at least one of nano-filtration and micro-filtration.

3. The method of claim 1, wherein the secondary treatment module further comprises an ion exchange media resin treatment.

4. A method of removing per- and poly-fluoroalkyl substances (PFAS) from a leachate stream, the method comprising:
    introducing the leachate stream comprising per- and poly-fluoroalkyl substances into a primary treatment module consisting essentially of a solids removal vessel that is configured to remove solids from the leachate stream using membrane filtration and produce an effluent stream; and
    introducing the effluent stream directly into a secondary treatment module comprising an adsorptive organic/clay based material and configured to adsorb microconstituents from the effluent stream,
    wherein the secondary treatment module produces a treated leachate stream that is substantially devoid of per- and poly-fluoroalkyl substances.

5. The method of claim 4, wherein the membrane filtration is at least one of nano-filtration and micro-filtration.

6. The method of claim 4, wherein the secondary treatment module further comprises an ion exchange media resin treatment.

7. A method of removing per- and poly-fluoroalkyl substances (PFAS) from a leachate stream, the method comprising:
    storing leachate comprising per- and poly-fluoroalkyl substances in a storage vessel;
    introducing leachate from the storage vessel directly into a primary treatment module using the leachate stream, wherein the primary treatment module consists essentially of a solids removal vessel that is configured to remove solids from the leachate stream using membrane filtration and produce an effluent stream; and
    passing the effluent stream directly from the primary treatment module into a secondary treatment module comprising an adsorptive organic/clay based material and configured to adsorb microconstituents from the effluent stream,
    wherein the secondary treatment module produces a treated leachate stream that is substantially devoid of per- and poly-fluoroalkyl substances.

8. The method of claim 7, wherein the membrane filtration is at least one of nano-filtration and micro-filtration.

9. The method of claim 7, wherein the secondary treatment module further comprises an ion exchange media resin treatment.

10. A method of removing per- and poly-fluoroalkyl substances (PFAS) from a leachate stream, the method comprising:
    storing leachate comprising per- and poly-fluoroalkyl substances in a storage vessel;
    introducing leachate from the storage vessel directly into a solids removal vessel using the leachate stream, wherein the solids removal vessel is configured to remove solids from the leachate stream using membrane filtration to produce an effluent stream; and
    passing the effluent stream directly from the solids removal vessel into an adsorption treatment vessel configured to adsorb microconstituents from the effluent stream using an adsorptive organic/clay based material, wherein the adsorption treatment vessel produces a treated leachate stream that is substantially devoid of per- and poly-fluoroalkyl substances.

11. The method of claim 10, wherein the membrane filtration is at least one of nano-filtration and micro-filtration.

12. The method of claim 10, further comprising passing the treated leachate stream through an ion exchange media resin treatment.

\* \* \* \* \*